H. C. H. WALSH.
GANG DIE PRESS.
APPLICATION FILED JULY 6, 1915.
1,288,316.
Patented Dec. 17, 1918.
18 SHEETS—SHEET 4.
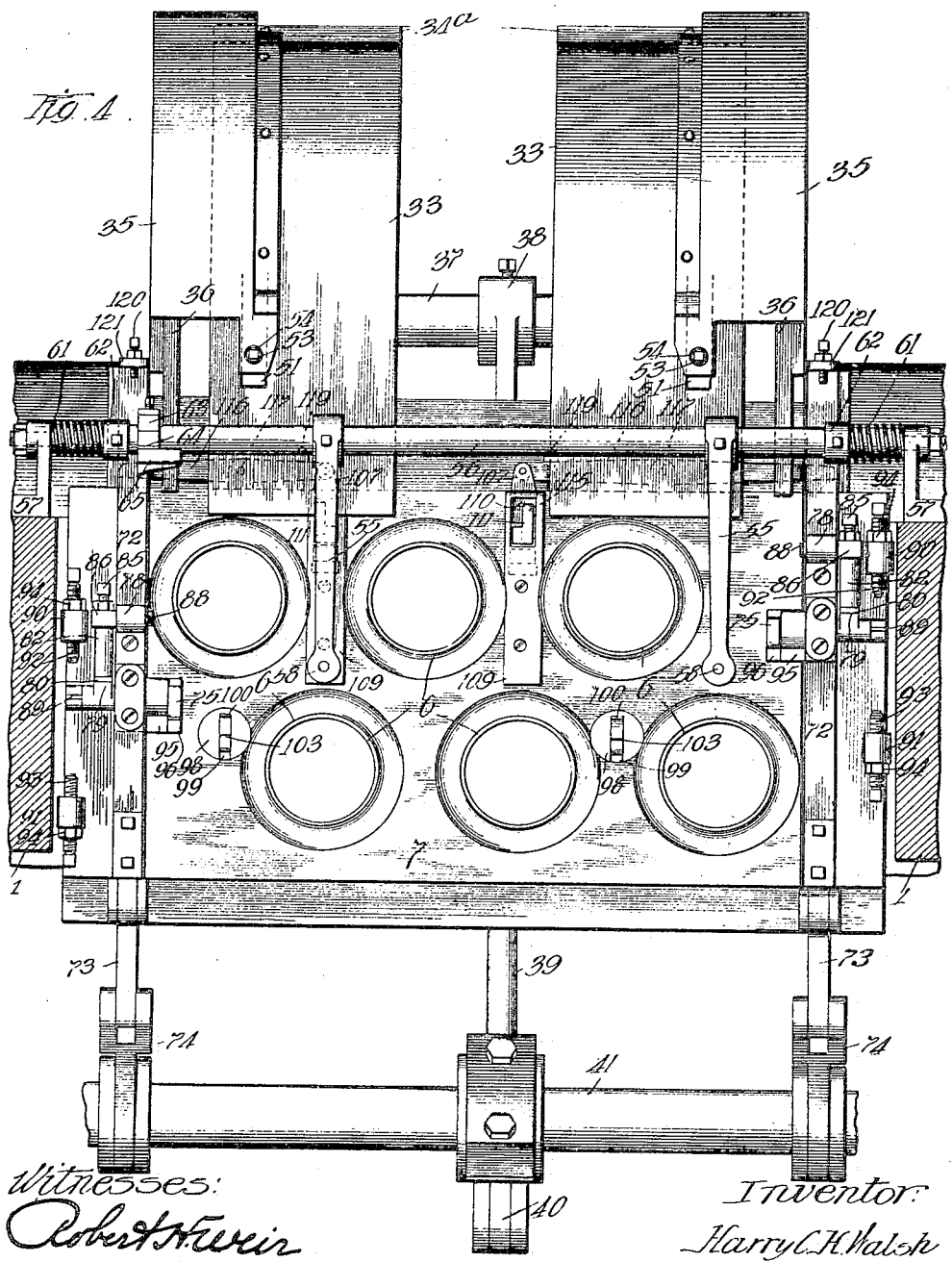

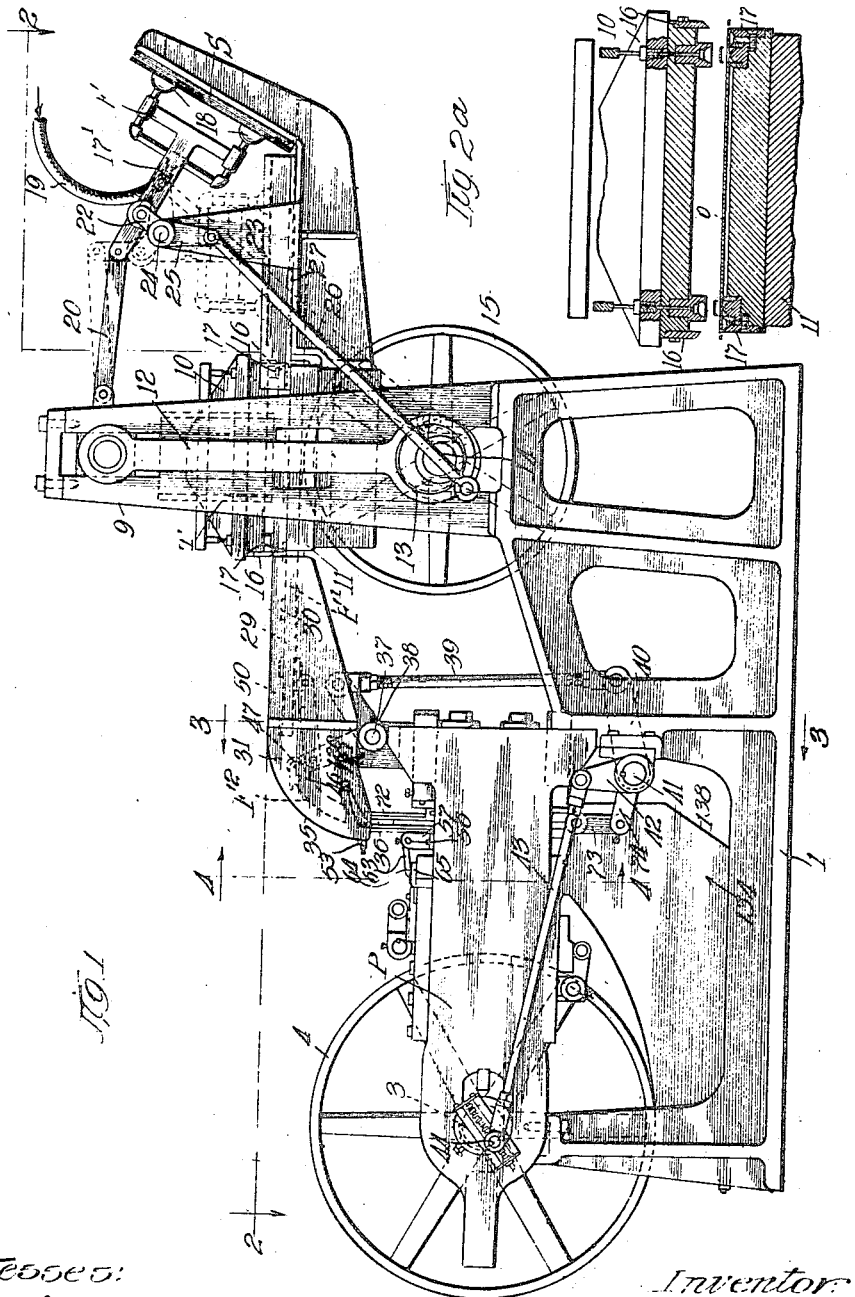

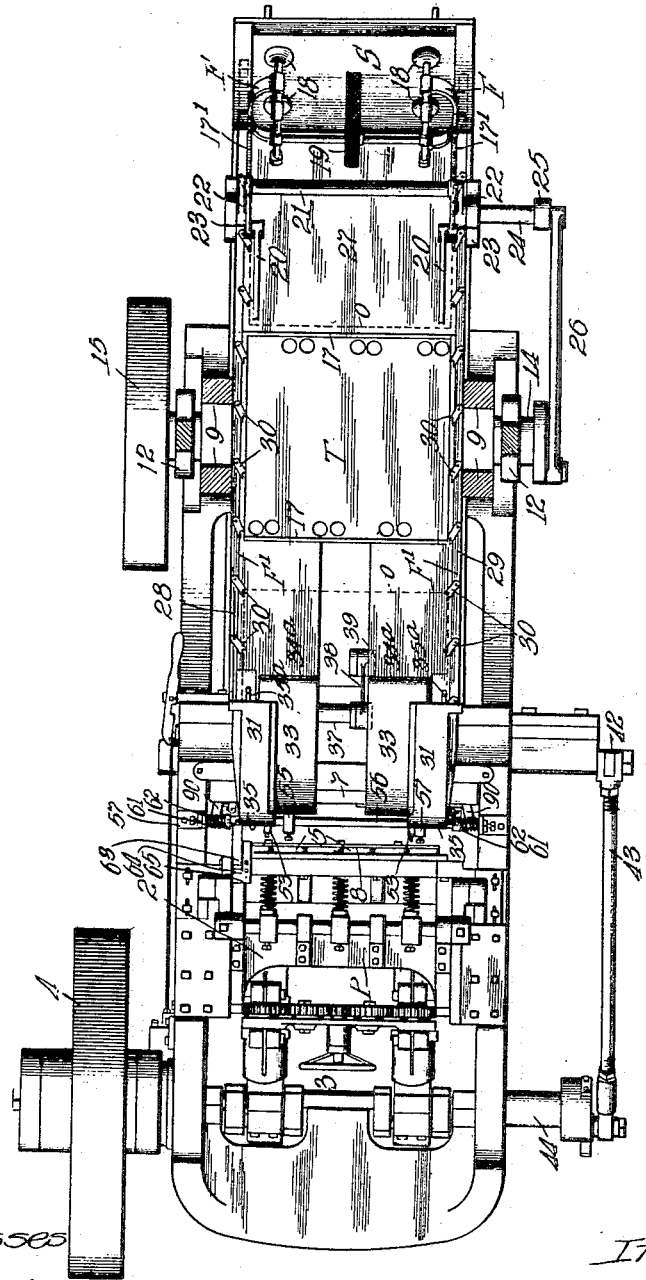

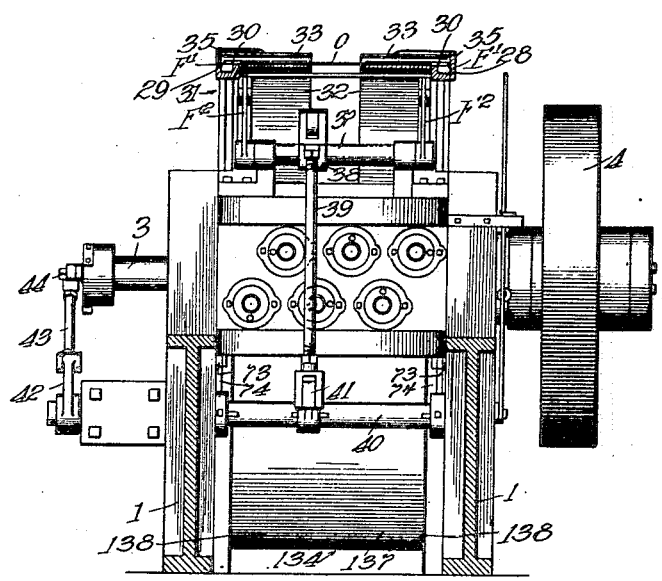

H. C. H. WALSH.
GANG DIE PRESS.
APPLICATION FILED JULY 6, 1915.
1,288,316.
Patented Dec. 17, 1918.
18 SHEETS—SHEET 5.
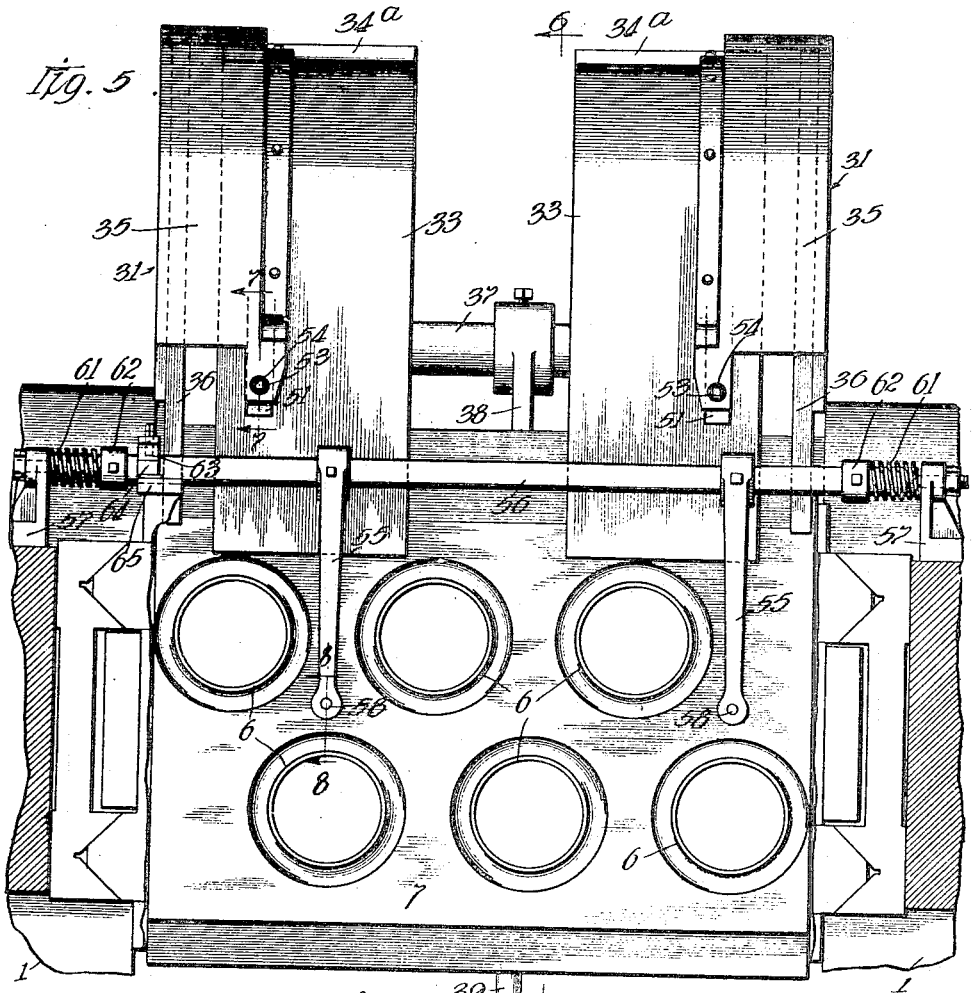
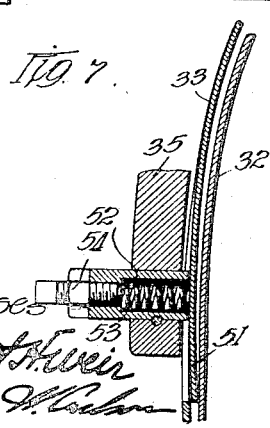
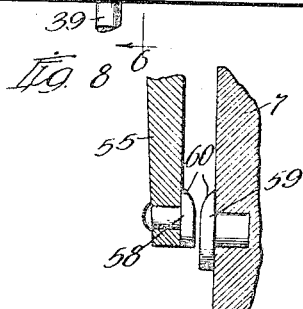
Inventor:
Harry C. H. Walsh,
By Sturtevant & Mason,
Attys.

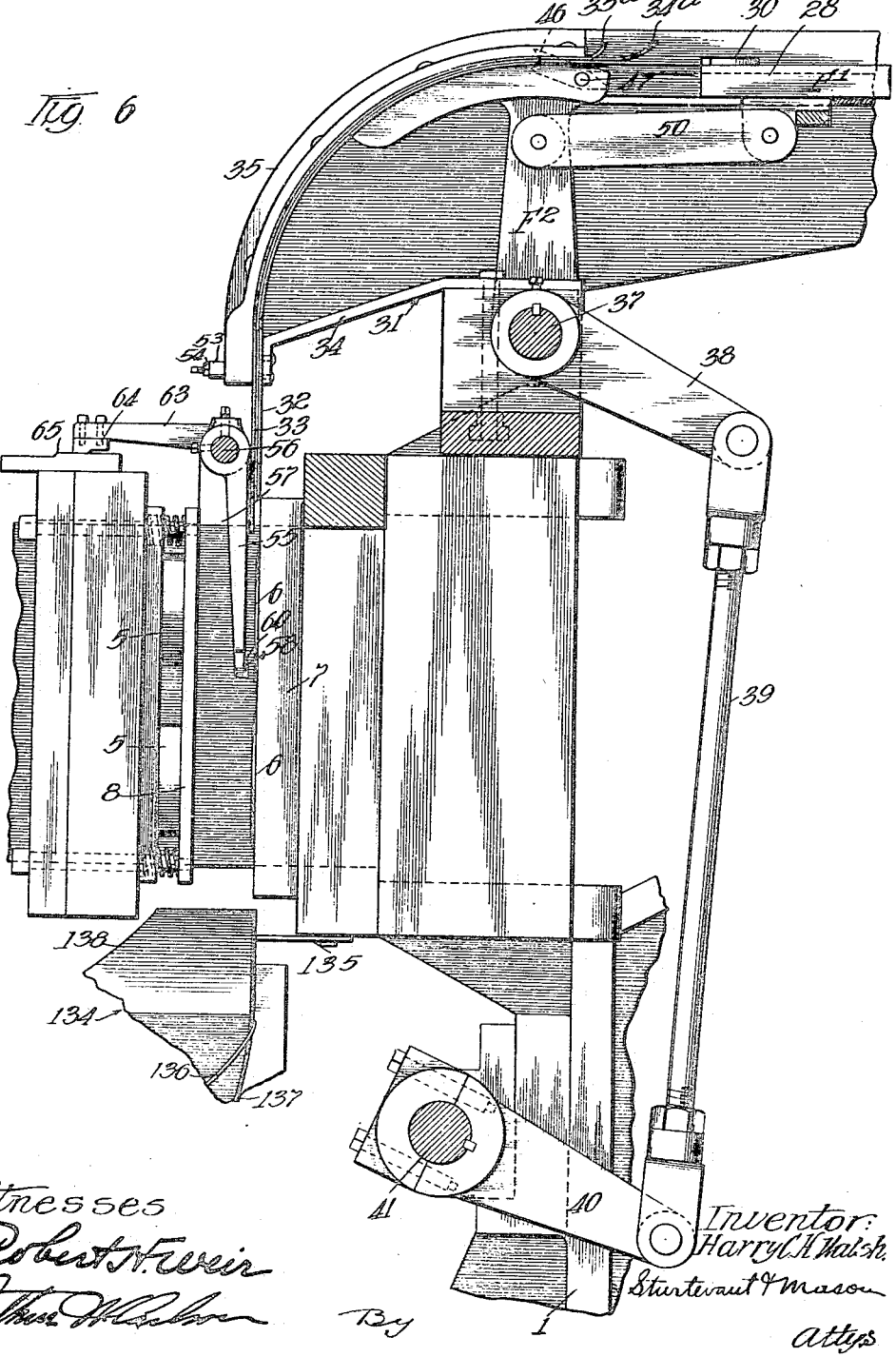

H. C. H. WALSH.
GANG DIE PRESS.
APPLICATION FILED JULY 6, 1915.
1,288,316.
Patented Dec. 17, 1918.
18 SHEETS—SHEET 7.
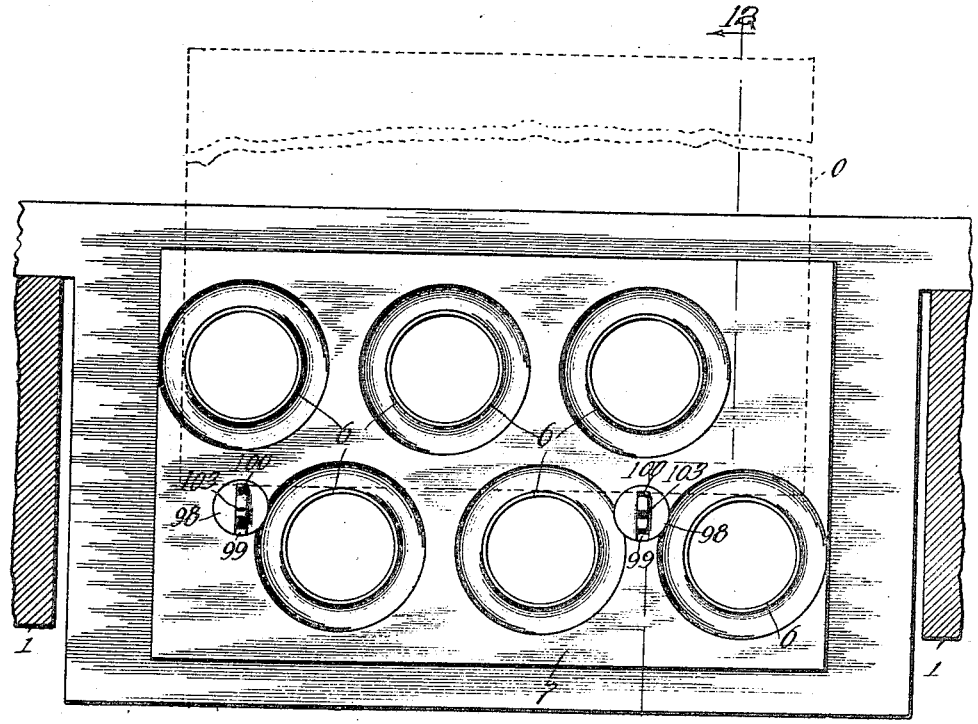
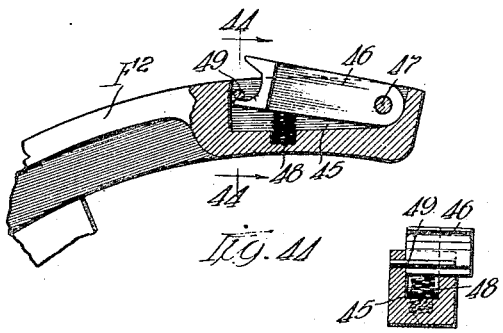
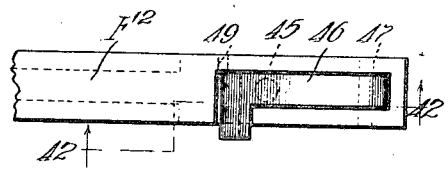
Witnesses:
Robert H. Weir
Arthur W. Carlson
Inventor.
Harry C. H. Walsh.
By Sturtevant Mason
Attys.

H. C. H. WALSH.
GANG DIE PRESS.
APPLICATION FILED JULY 6, 1915.
1,288,316.
Patented Dec. 17, 1918.
18 SHEETS—SHEET 8.
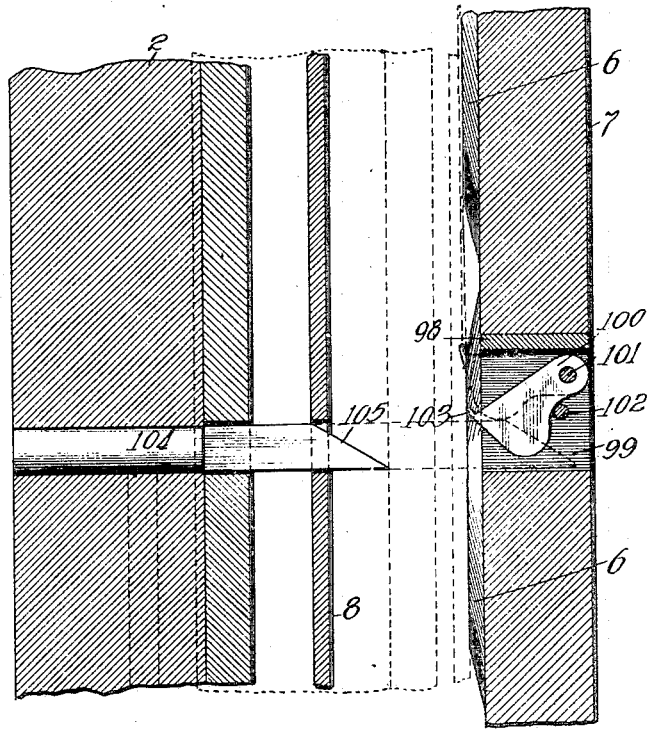
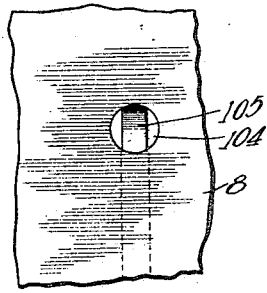
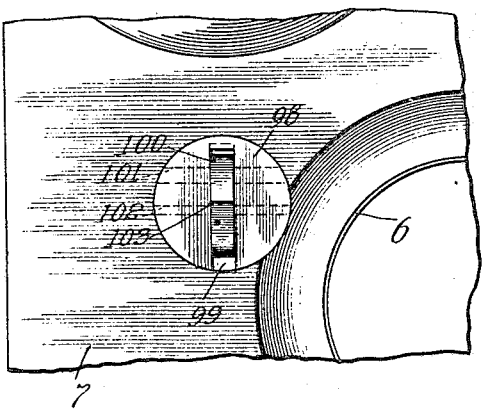
Witnesses:
Robert F. Weir
Arthur W. Carlson
Inventor.
Harry C. H. Walsh
By Sturtevant & Mason
Atty

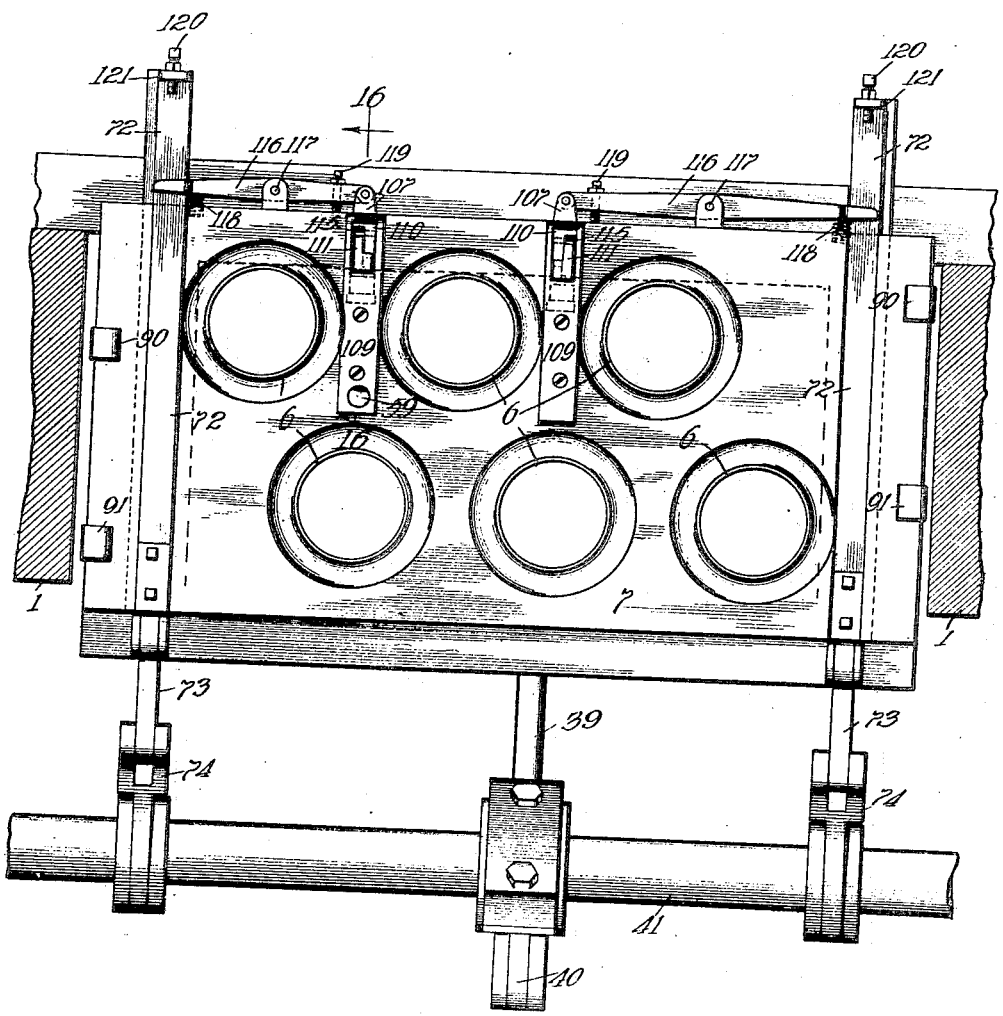

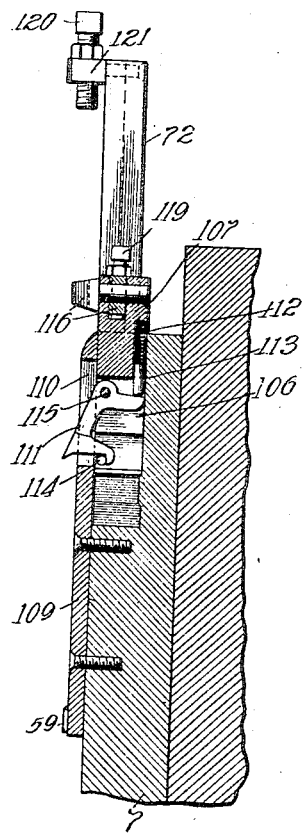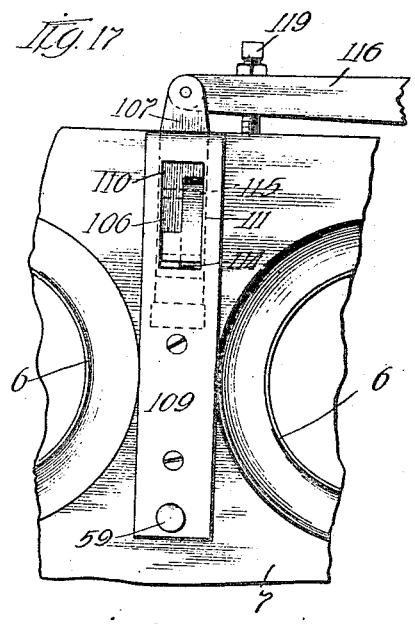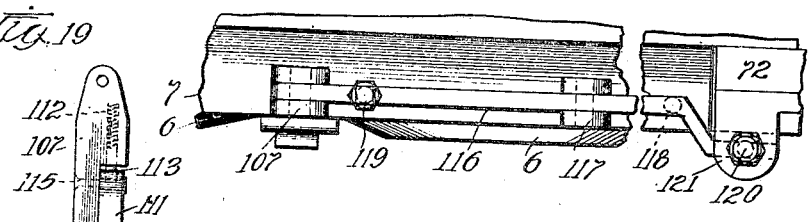

H. C. H. WALSH.
GANG DIE PRESS.
APPLICATION FILED JULY 6, 1915.

1,288,316.

Patented Dec. 17, 1918.
18 SHEETS—SHEET 11.

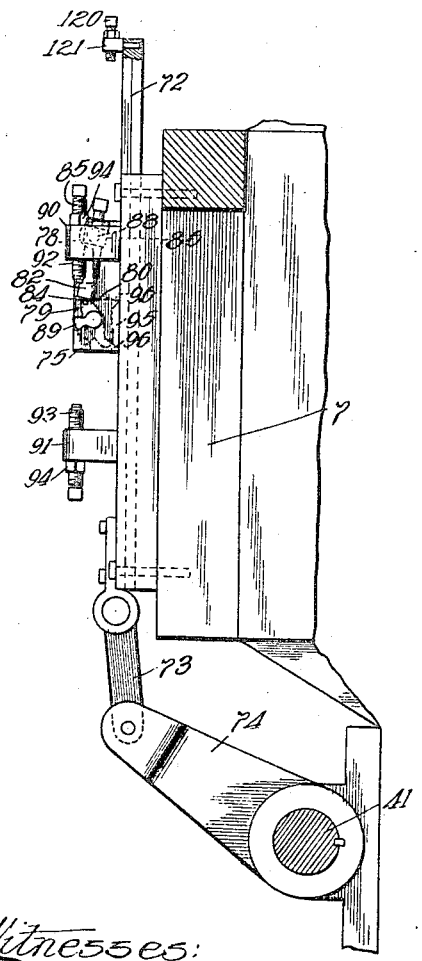
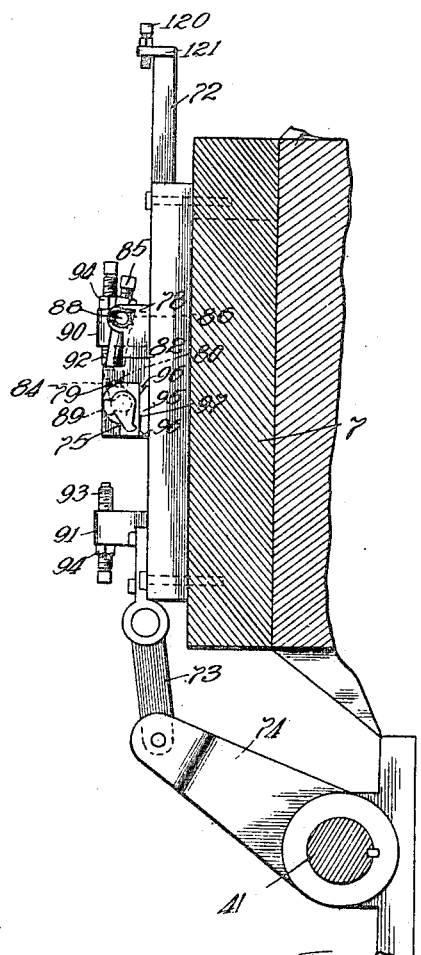

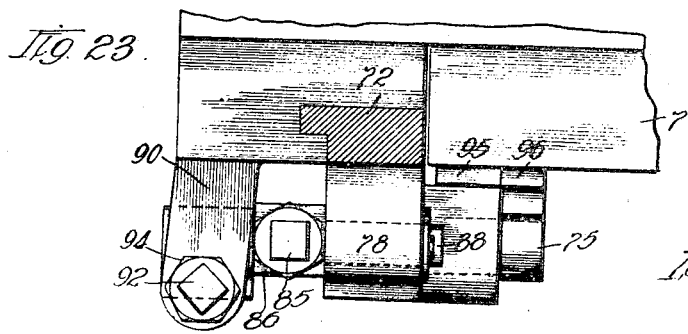
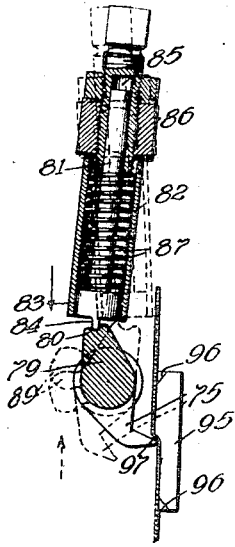
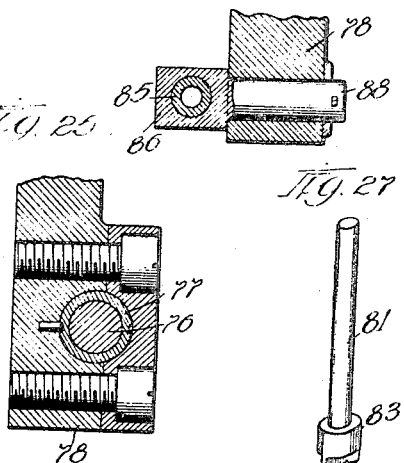
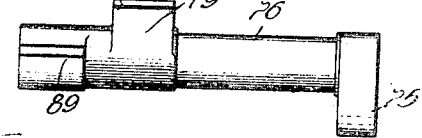
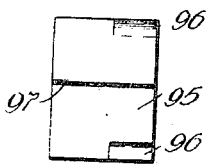

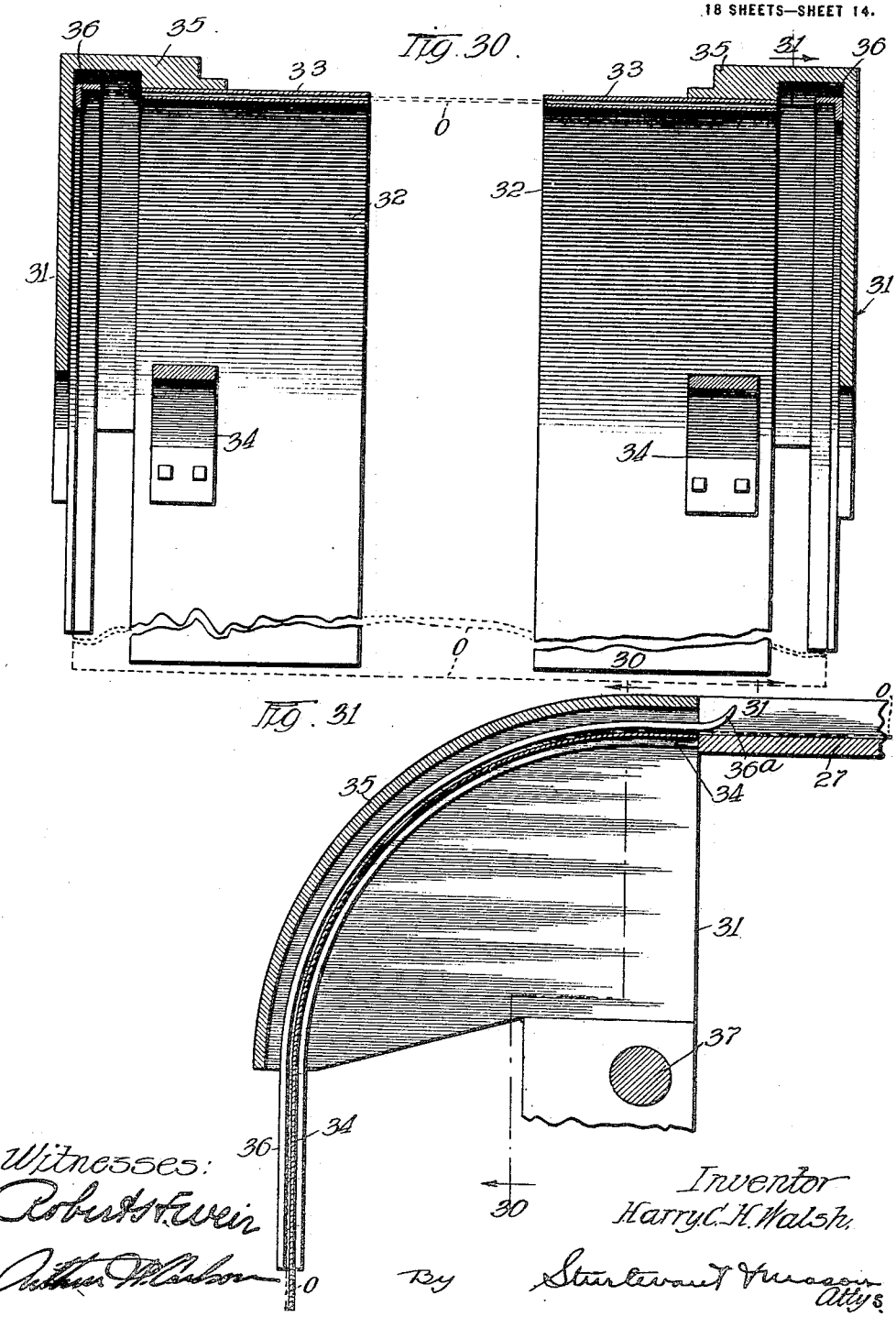

H. C. H. WALSH.
GANG DIE PRESS.
APPLICATION FILED JULY 6, 1915.
1,288,316.
Patented Dec. 17, 1918.
18 SHEETS—SHEET 15.
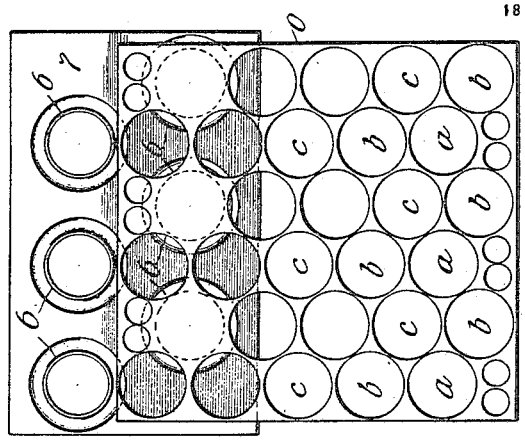
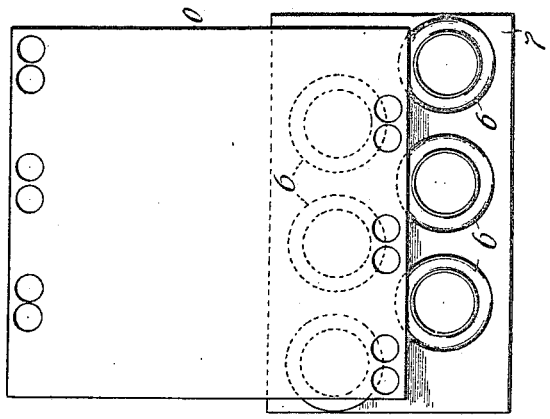
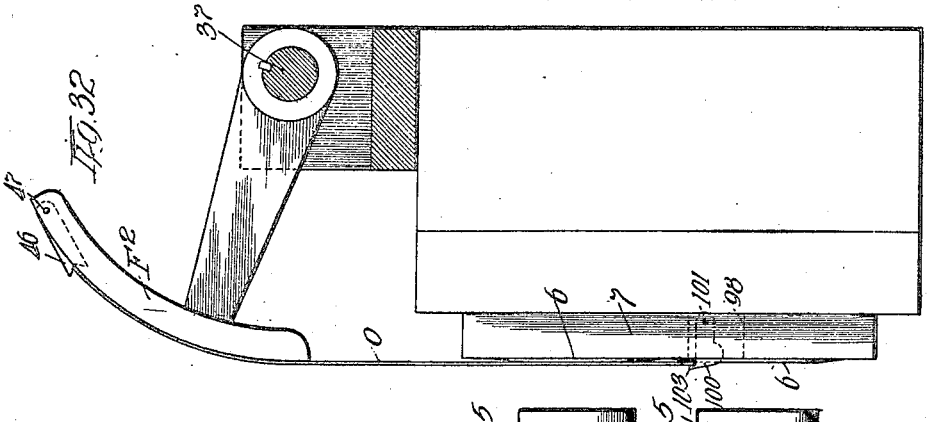
Inventor.
Harry C. H. Walsh.

H. C. H. WALSH.
GANG DIE PRESS.
APPLICATION FILED JULY 6, 1915.
1,288,316.
Patented Dec. 17, 1918.
18 SHEETS—SHEET 16.
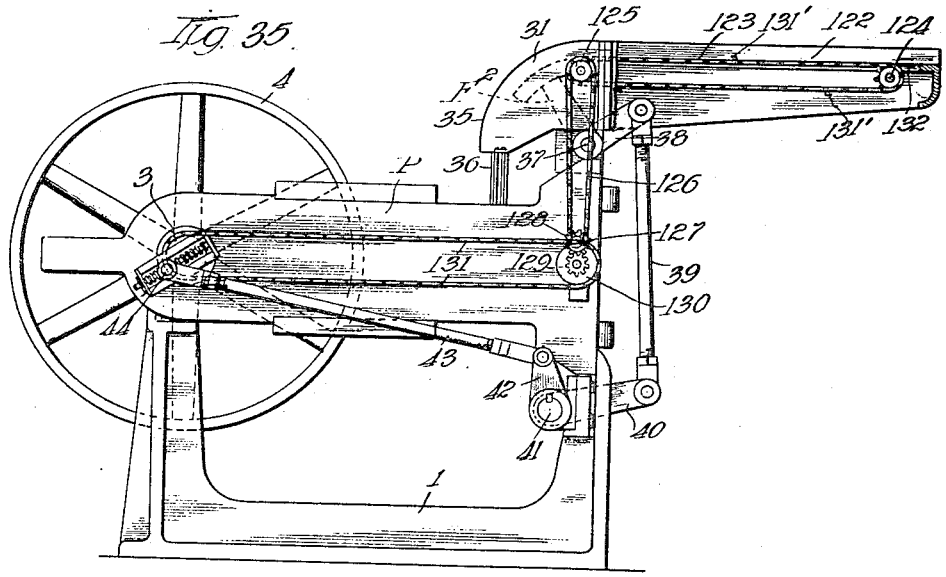
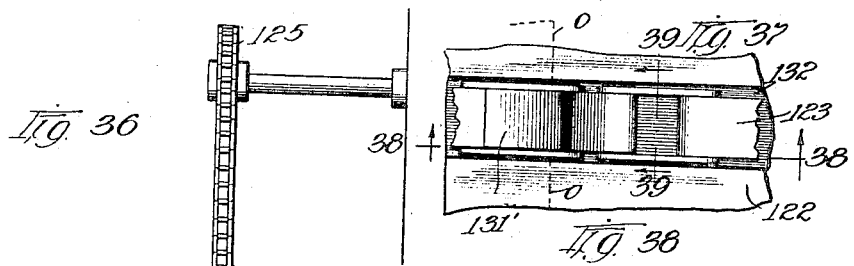
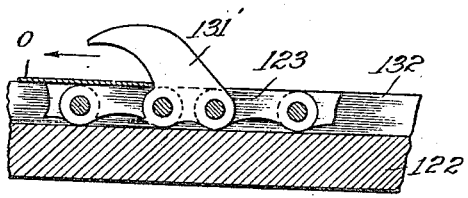
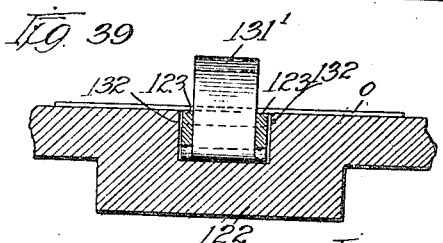
Inventor
Harry C. H. Walsh
By Sturtevant & Mason
Attys.

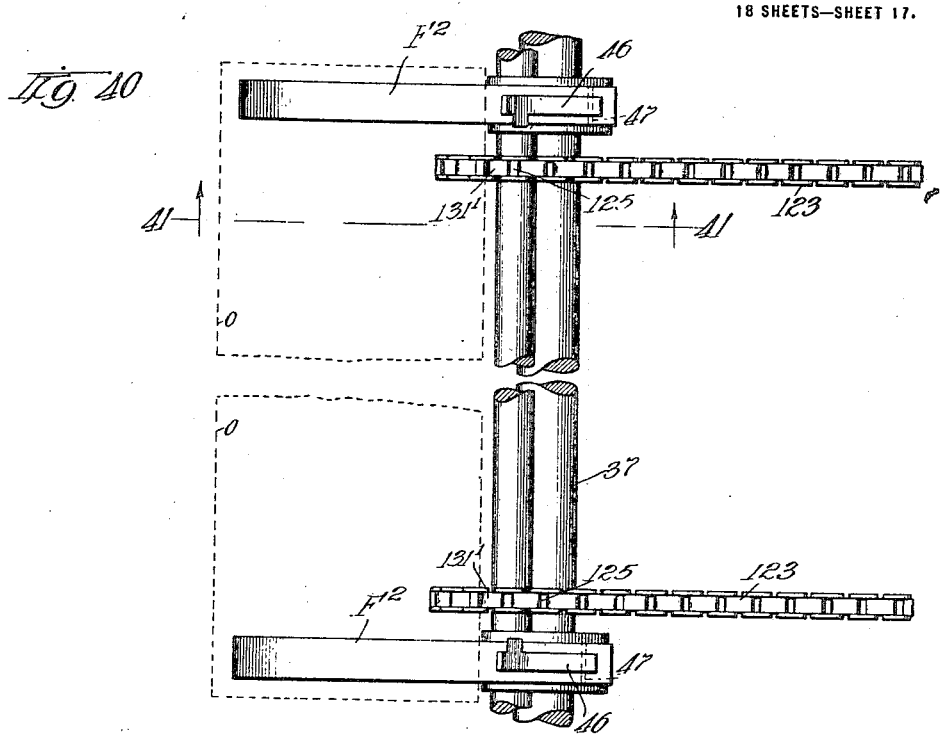

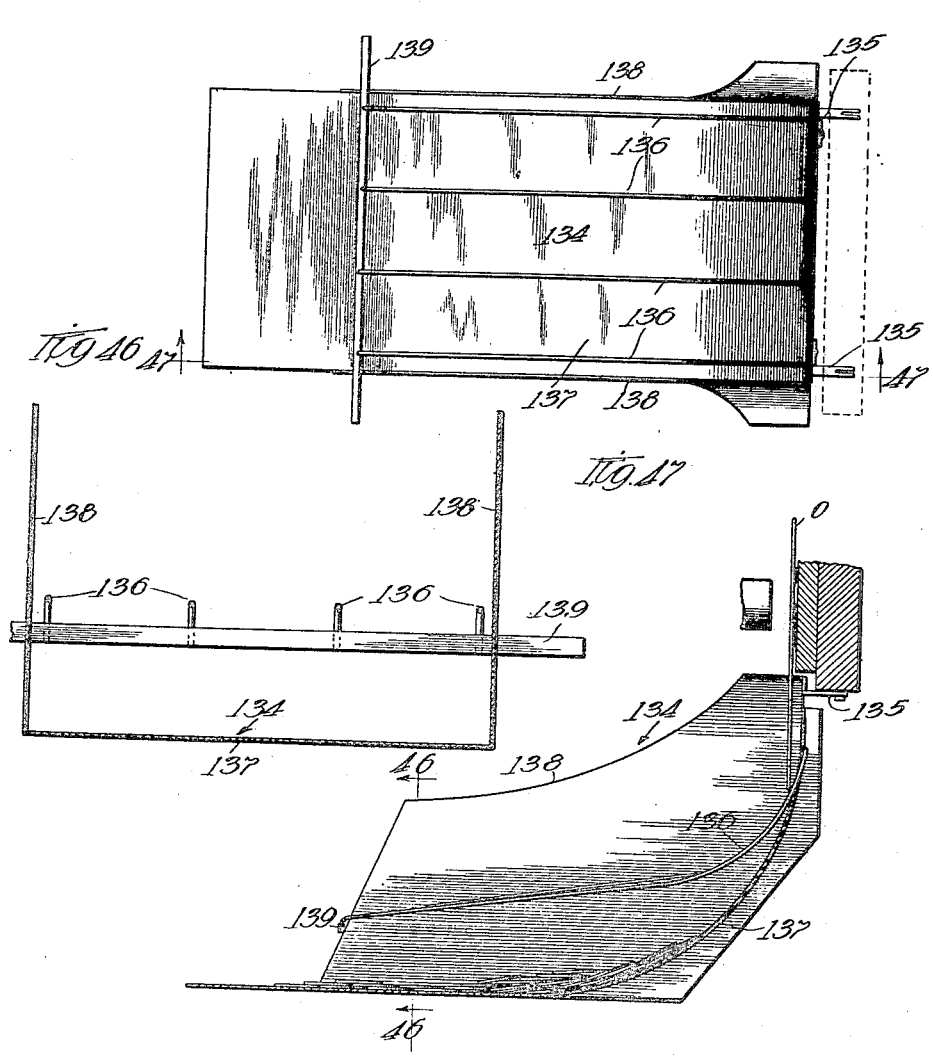

UNITED STATES PATENT OFFICE.

HARRY C. H. WALSH, OF CHICAGO, ILLINOIS, ASSIGNOR TO CONTINENTAL CAN COMPANY, INC., OF SYRACUSE, NEW YORK, A CORPORATION OF NEW YORK.

GANG DIE-PRESS.

1,288,316.

Specification of Letters Patent.

Patented Dec. 17, 1918.

Application filed July 6, 1915. Serial No. 38,315.

*To all whom it may concern:*

Be it known that I, HARRY C. H. WALSH, a citizen of the United States, residing at Chicago, in the county of Cook, State of Illinois, have invented certain new and useful Improvements in Gang Die-Presses, of which the following is a description, reference being had to the accompanying drawing, and to the figures of reference marked thereon.

The invention relates to new and useful improvements in die presses, and more particularly to a die press for cutting can ends from sheet metal.

An object of the invention is to provide a gang die press for cutting and forming articles with means for receiving and automatically feeding the sheet step by step to the dies.

A further object of the invention is to provide a die press of the above character with means for justifying the initial position of the sheet so as to insure the idle dies escaping the sheet.

Another object of the invention is to provide means for justifying the final positioning of the sheet so as to insure that the idle dies on this operation shall escape the sheet.

A further object of the invention is to provide a machine of the above character, wherein caps or the like may be cut from the waste material of the sheet or some other preparing operation performed on the sheet prior to the presenting of the same to the gang die press.

A further object of the invention is to provide a mechanism of the above character with means for trimming the sheet preparatory to the operation of the gang die press thereon.

A further object of the invention is to provide a device of the above character, wherein the sheets are in horizontal position when operated upon by the cap cutting means and in vertical position when operated upon by the end cutting and forming means, said sheet when passing from one operating means to the other being progressively curved transversely for removing the buckles from the sheet.

These and other objects will in part be obvious and will in part be hereinafter more fully described.

In the drawings which show by way of illustration one embodiment of the invention—

Figure 1 is a side elevation of a combined machine embodying my improvements;

Fig. 2 is a sectional view on the line 2—2 of Fig. 1;

Figure 20:
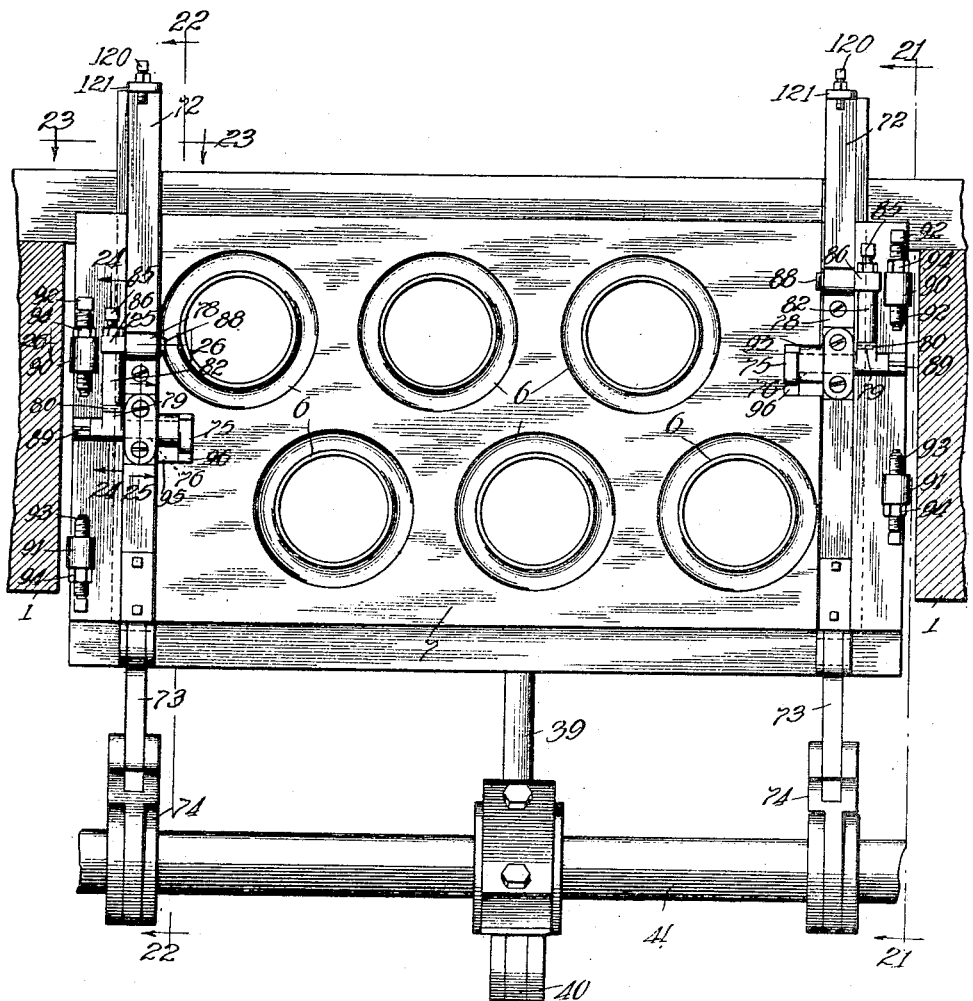

Fig. 2ª is a sectional view through the die press for cutting the caps.

Fig. 3 is a view partly in section and partly in end elevation, on the line 3—3 of Fig. 1;

Fig. 4 is a sectional view on the line 4—4 of Fig. 1;

Fig. 5 is a view, similar to Fig. 4, but showing only the pressers for temporarily holding the sheet during the punching operation.

Fig. 6 is a sectional view on the line 6—6 of Fig. 5;

Fig. 7 is a sectional view on the line 7—7 of Fig. 5, showing the means for frictionally engaging the sheet as it is fed to the dies;

Fig. 8 is a sectional view on the line 8—8 of Fig. 5, showing the end of one of the pressers and the means which coöperate therewith;

Fig. 9 is a detail, partly in section and partly in side elevation, showing a modified form of means for operating the pressers;

Fig. 10 is a plan view of the same;

Fig. 11 is a view showing the supporting beds for the dies, the dies and the justifying means for initially positioning the sheet and also the sheet in dotted lines;

Fig. 12 is a sectional view on the line 12—12 of Fig. 11;

Fig. 13 is a detail showing a portion of the movable head for the punches and the operating cam rod for the justifying fingers;

Fig. 14 is an enlarged view similar to Fig. 11 of one of the justifying fingers;

Fig. 15 is a detail showing the supporting bed and the dies carried thereby and also the justifying means for the final positioning of the sheet;

Fig. 16 is a sectional view on the line 16—16 of Fig. 15;

Fig. 17 is an enlarged detail of one of the justifying fingers and the immediate operating mechanism therefor;

Fig. 18 is a top plan view showing the operating lever for the justifying finger;

Fig. 19 is a detail, showing in front view a supporting slide and justifying finger carried thereby;

Fig. 20 is a view showing the supporting bed and the dies mounted therein and also showing the intermittent feed operating mechanism for presenting the sheet step by step to the gang of dies;

Fig. 21 is a sectional view on the line 21—21 Fig. 20, showing the reciprocating slide and the feeding mechanism carried thereby; also the tripping stops, these parts being in side elevation;

Fig. 22 is a similar view on the line 22—22 of Fig. 20;

Fig. 23 is a sectional view on the line 23—23 of Fig. 20;

Fig. 24 is a sectional view on the line 24—24 of Fig. 20;

Fig. 25 is a sectional view on the line 25—25 of Fig. 20;

Fig. 26 is a sectional view on the line 26—26 of Fig. 20;

Fig. 27 is a perspective view of the holding dog for the feed gripper;

Fig. 28 is a side view of the feed gripper;

Fig. 29 is a plan view of the gripper plate which coöperates with the gripper finger;

Fig. 30 is a sectional view on the line 30—30 of Fig. 31, showing the guiding plates and the edge guide for directing the sheet of metal from horizontal position to a vertical position where it is presented to the die press;

Fig. 31 is a sectional view on the line 31—31 of Fig. 30;

Fig. 32 is a view more or less diagrammatical, showing the feeding-in arm, the justifying arm for initially positioning the sheet, the bed of the press and the punches for cutting the ends and forming the same;

Fig. 33 is a diagrammatic view, showing the supporting bed and the dies carried thereby and the position of the sheet for the initial cutting of the same;

Fig. 34 is a similar view, showing the sheet in its final position for cutting;

Fig. 35 is a side view of a die press for cutting and forming can ends, showing a modified form of means for feeding the sheets to the step by step feeding mechanism of the die press;

Fig. 36 is an end elevation showing a portion of the feeding means above referred to;

Fig. 37 is an enlarged view of a section of the feed chain, showing in dotted lines a portion of a sheet being fed thereto;

Fig. 38 is a sectional view on the line 38—38 of Fig. 37;

Fig. 39 is a sectional view on the line 39—39 of Fig. 37;

Fig. 40 is a top plan view, showing the feeding-in chains of the modified form of the invention and the oscillating feeding-in arms;

Fig. 41 is a sectional view on the line 41—41 of Fig. 40;

Fig. 42 is an enlarged detail of the rear end of the feeding-in arm, showing the yielding finger for engaging the sheet in side view;

Fig. 43 is a plan view of the same;

Fig. 44 is a section on the line 44—44 of Fig. 42;

Fig. 45 is a plan view of the chute for catching the finished ends and the separating rack for the scrap metal;

Fig. 46 is a sectional view on the line 46—46 of Fig. 47; and

Fig. 47 is a sectional view on the line 47—47 of Fig. 45.

The invention consists generally in providing a gang die press for cutting and forming can ends or the like which constitutes one operating station and means whereby the waste material may be cut and formed into bottle caps, nail caps or the like and the sheet trimmed or otherwise operated upon which constitutes another operating station. This last named station is primarily an operating station for preparing the sheet for the die press, so that when the die press is operated upon the sheet, all the available metal has been utilized. The sheets are fed to this preparing station preferably from a stack by a pneumatic feeder which lifts the sheets one at a time from the stack and places the same on a reciprocating feeding mechanism, which is so timed as to present the sheets to the cap-forming mechanism and trimming mechanism and then deliver the sheets to feeding-in arms which convey the same to the gang die press. The sheets pass horizontally through the preparing station and vertically through the die press or second operating station. As the sheets are delivered from the horizontal feeding mechanism to the intermittent vertical feeding mechanism of the die press they are curved transversely, which tends to take any buckles or bends out of the sheet.

The sheet is presented to the gang die press by oscillating arms. These arms may initially present the sheet for the first cutting operation, but I prefer to use in conjunction with said feeding-in arms justifying fingers which engage the lower edge of the sheet and accurately position the same so that the idle dies will pass the edge of the sheet without striking the same. These justifying fingers are of especial utility in conjunction with sheets which vary slightly in length. The sheets are fed to the gang dies by a step-by-step feeding mechanism. The length of feed is determined by fixed adjustable stops and not by the length of stroke of the slides which carry the feeding fingers. Therefore, the position of the sheet may be accurately determined. Coöperating with the feeding mechanism are presser fingers which intermittently grip the sheet and hold the same while the feed is on its idle movement. I have also provided a justifying means which positions the sheet for the last action of the gang of dies thereon, so that in the final cutting of the sheet, the idle dies will pass clear of the edge of the sheet.

General structure.

Referring more in detail to the drawings, my improved die press consists of a horizontally arranged die press P, which is mounted on a suitable supporting bed frame 1. The supporting bed also carries a preparing mechanism T which operates upon the sheet to punch or cut bottle caps, nail caps or the like from the waste material and which may also operate upon the sheet to trim the same, if desired. The sheets are placed in a stack S, and are taken one at a time by a pneumatic feeding-in device F, which feeds the sheet on to a reciprocating feeding mechanism F', and this reciprocating feeding mechanism presents the sheets first to the preparing mechanism, indicated at T, and thence to oscillating arms F² which feed the sheets to the gang die press P.

Gang die press.

This die press consists of a reciprocating head 2, which is connected to an operating shaft 3, driven by a belt wheel 4. As the shaft rotates the reciprocating head is moved back and forth in a horizontal direction. The reciprocating head, as herein shown, carries six punches or male dies, indicated at 5 in Fig. 2, and these male dies coöperate with the six female dies 6, carried by a supporting bed 7. The dies are arranged in two rows and staggered relative to each other, as clearly shown in Fig. 4. Coöperating with the dies is a stripper plate 8, which is of the usual construction. Each punch is also provided with an ejector for stripping the finished can end therefrom. This die press is of the usual construction and further description thereof is not thought necessary.

Mechanism for preparing sheet.

The main frame 1 is provided with uprights 9 which carry a reciprocating head 10 and a supporting bed 11. The reciprocating head 10 is moved on the up-rights by links 12, which coöperate with eccentrics 13 on a shaft 14, and the shaft 14 is driven by a belt wheel 15, or other suitable driving mechanism. This reciprocating head 10 is provided with a gang of punches, which operate to cut nail caps or bottle caps or the like from the sections of the sheet which form the waste material when the sheet is presented through the gang die press P. This reciprocating head 10 may also be provided with shear blades 16, which are adapted to coöperate with shear blades 17 on the supporting bed 11 for trimming the ends of the sheet.

Automatic mechanism for feeding the sheets from the stack through the preparing mechanism to the gang die press.

The sheets are placed in the stack S, as above noted, and are taken one at a time therefrom by the pneumatic feeding device F, which consists of a supporting frame 17', which supporting frame carries pneumatic cups 18 for lifting the sheets. These cups are carried by suitable pipes connected to a suction pipe 19. The frame 17' is pivoted to links 20, which in turn are pivoted to the up-rights 9. The frames 17', at each side of the machine, are connected to a cross-rod 21, which is carried by arms 22 pivotally supported by standards 23, respectively. One of the arms 22 is mounted on a short shaft 24, which carries a downwardly extending arm 25 connected by a link 26 to a crank arm on the shaft 14. The rotation of the shaft 14 will oscillate the frame 17' and thus carry a sheet from the stack on to the table 27. The sheet is released in the well known way. Reciprocating lengthwise of the table 27 are two feed bars 28 and 29, which are provided with a series of feed fingers 30. These feed fingers engage the sheet and carry the same step by step along the table 27 underneath the reciprocating head 10, where the sheet dwells while it is being punched and trimmed, if a trimming mechanism is used.

After the preparing operation, the sheet is carried along by these feed bars to the end of the table 27, where it is delivered to guiding plates 31. These guiding plates 31 are curved, as clearly shown in the drawings, so as to change the direction of the sheet from a horizontal position to a vertical position. There are inner curved guiding plates 32 and outer curved guiding plates 33 at each side of the sheet. The inner guiding plates are carried by the brackets 34 which are attached to the main frame of the machine. These guiding plates are spaced a sufficient distance from each other, so as to freely guide the sheet without placing undue friction thereon. The outer guiding plates 33 have their receiving ends curved outwardly at 34ª to facilitate the guiding of the sheet between the plates. In Figs. 30 and 31 of the drawings, I have shown in enlarged views these guiding plates and the sheet of metal, indicated at O, passing between the plates and curved transversely. It will be apparent that, as the sheet passes between these plates, this curving of the sheet will progress from one end of the sheet to the other and this bending of the sheet not only strengthens the sheet, so that it may be forced forward to the gang die press by pushing fingers which engage the rear end of the sheet, but the bending of the sheet also tends to take out of the sheet any buckles or bends which may be formed therein.

The guide plates 33 are riveted to curved end supports 35, which are mounted on the frame of the machine and these end supports also carry curved angle bars 36, which are so positioned relative to the guiding plates 32 and 33 as to form an edge guide for the sheet as it passes through the curved plates. The supports 35 are curved outwardly at $35^a$. The receiving ends of these angle bars are turned upwardly, as at $36^a$, to facilitate the passing of the sheet under the same. The sheet, as it engages these edge guides, will be kept in accurate sidewise position as it is delivered to the feeding mechanism for presenting the same to the gang die press. The sheet of metal is conveyed through the curved guiding plates 32 and 33 by oscillating arms $F^2$. The oscillating arms $F^2$ are carried by a shaft 37, which is mounted in suitable bearings in the main frame and this shaft is oscillated by an arm 38, which is connected to a link 39. The link 39 at its lower end is attached to a rock arm 40 of a shaft 41, which carries a second arm 42 connected by a link 43 with an adjustable crank pin 44 on the main shaft 3. The oscillating arms $F^2$ are curved and engage the sheets at the opposite ends of the guide plates 32 and 33, respectively, see Fig. 3. As clearly shown in Fig. 30, these guides plates are spaced from the edge guides 36 and the oscillating arms $F^2$ operate in this space. Each oscillating arm is formed with a recess or pocket 45, in which is located a finger 46. This finger is pivoted at 47 and a spring 48 normally forces the same outward, see Figs. 42 and 44. A stop 49 limits the outward movement of the fingers.

The feed bars 28 and 29 constituting the feeding mechanism F', are connected to the oscillating arms $F^2$ by links 50, so that the feed bars are reciprocated in unison with the oscillating arms $F^2$. As the sheet is carried forward by the fingers on the feed bars 28 and 29, the sheet will be moved over these yielding fingers 46, depressing the same into the recess or pocket in the oscillating arm. The stroke of the oscillating arms $F^2$ is sufficient, so that when the last feeding movement of the bars 28 and 29 positions the sheet between the curved guiding plates, the rearward movement of the oscillating arm $F^2$ will cause the fingers 46 to pass clear of the rear end of the sheet and these fingers will be forced by the springs 48 outward, so that on the next forward movement of the oscillating arm $F^2$, the sheet will be conveyed through the guiding channels formed by the spaced guiding plates to its initial position in the gang die press P. The link 39, connecting the oscillating arms $F^2$ to its operating rock shaft, has its opposite ends formed with right and left hand threads and a turning of the link will, therefore, either shorten or lengthen the link and vary slightly the operating position of the oscillating arms $F^2$. This adjustment of the oscillating arms enables the initial positioning of the sheet in the die press to be slightly varied.

*Gripping mechanism for sustaining sheet.*

In order to place a frictional grip on the sheet to prevent it from dropping from the machine as it is fed in its vertical position to the gang press, I have provided friction arms. There are two frictional gripping arms 51, and as herein shown these arms are formed by cutting the outer guiding plates 33, as clearly shown in Figs. 5 and 7. The arms are integral with the guiding plates and their free ends are each forced into contact with the sheets passing through the guiding channels between the plates by a spring 52, which is mounted in a sleeve 53 carried by the outer supporting plates 35. These sleeves are secured in the supporting plates in any suitable way and the outer ends of the sleeves are threaded to receive a tension bolt 54. This tension bolt bears against the outer end of the spring 52 and by adjusting the bolt the grip of the arms 51 may be varied. These gripping arms 51 place a uniform frictional grip or tension on the plates as they pass through the guiding channels.

A second gripping means for holding the sheets while the intermittent feed is on its idle stroke consists of two arms 55. These arms are mounted on a shaft 56, which is journaled in suitable bearings 57, see Figs. 5 and 6. The arms 55, at their lower ends, are provided with gripping faces 58. The main bed of the die press is formed with coöperating gripping studs 59. The upper parts of the gripping face and the stud 59 are tapered, as at 60, to facilitate the free entering of the sheet between these gripping parts. The gripping faces 58, as clearly shown in Fig. 5, are disposed in line passing substantially between the rows of the dies and are directly above the outer dies of the lower row, so that as the sheet passes in a downward direction from the dies as viewed in Fig. 5, these gripping faces will always contact with an uncut portion of the sheet.

The shaft 56 supporting these gripping arms 55 is normally turned by spring 61, so as to hold the gripping faces 58 in contact with the gripping studs 59, and these springs are coiled about the shaft 56 and are attached at one end of each spring to the supporting bearing for the shaft, while the other end is attached to a collar 62 fastened to the shaft by a set-screw. By adjusting these collars 62 the tension of the springs may be varied. The shaft 56 is oscillated to move the gripping face out of contact with the sheet to release the same by an arm 63 which is secured at one end of the shaft. This arm projects toward the reciprocating head of the die press and is provided with a plate 64 adapted to rest upon a cam block 65. The cam block 65 reciprocates with the head of the die press and this causes the plate 64 carried by the arm 63 to ride either on the low level of the cam block 65 or the high level thereof, as shown in Fig. 6. When the block is on the high level, then the arms 55 are moved outward through the rising of the arm 63 and this causes the sheet to be released, while, when the die head is moved to the right, as viewed in Fig. 6, the arm 63 will be released and the springs will throw the arms 55 so as to cause the gripping faces 58 to grip the sheets. These gripping arms are, therefore, intermittently oscillated and, as will appear hereinafter, the timing of the arms is such as to grip and hold the sheet while the intermittent feeding device is on its idle movement.

In Figs. 9 and 10 of the drawings, I have shown a modified form of mechanism for holding the gripping arms 55 in contact with the sheet. In this form of the invention coil springs 61 are omitted. The shaft 56 is provided with the arms 63 which coöperates with the block 65 for moving the arms outward to release the sheet. The said shaft 56 is also provided with an arm 66. This arm 66 carries a bolt 67 having a head 68 which is adapted to reciprocate in a recess 69 formed in the main frame. A spring 70, located in said recess, engages the lower face of the head and forces the arm 66 upward. This upward movement of the arm 66 causes the arms 55 carried by the shaft 56 to move inwardly to grip the sheet. The bolt 67 may be adjusted in the arm 66 and held in adjusted position by a suitable locknut 71.

*Intermittent feeding mechanism for presenting the sheet step by step to the gang dies.*

The intermittent feeding mechanism for feeding the sheets step by step to the gang dies is illustrated in detail in Figs. 21 to 29, inclusive. The die press, as herein shown, consists of six staggered dies arranged in two rows. The machine herein described may be used for cutting thirty-ean ends from a standard sheet of metal. This is accomplished by six operations of the dies on the sheet, as clearly shown in Fig. 34 of the drawings. In the first operation the ends are cut from the openings indicated at $a$ and three ends only are cut at this operation. At the second operation the ends are cut from the openings indicated at $b$, and six ends are cut at this operation. This is followed by cutting the ends from the openings indicated at $c$ and so on through the cutting of the sheet, the last operation cutting only three ends as the sheet is positioned for this operation, as indicated in Fig. 34. As viewed in this figure, it will also be apparent that the sheet must be very accurately fed in order that there shall be a minimum amount of waste material.

My improved step-by-step feeding mechanism has been designed with especial reference to accurately feeding and positioning the sheet, so as to accomplish this result of a minimum waste of material.

The feeding mechanism consists of two reciprocating bars 72, which are located at opposite ends of the main bed of the press and these bars reciprocate in suitable guideways formed therein. Each bar at its lower end is pivoted to a link 73 which in turn is pivoted to a crank arm 74, carried by the shaft 41. This shaft 41, as above described, is oscillated through the link 43 by a crank 44 on the end of the main shaft 3. As the shaft 41 oscillates the bars 72 will be reciprocated in their guide-ways. Mounted on each reciprocating bar 72 is a gripping finger 75. The gripping finger is carried by a short shaft 76, which is journaled in a hardened sleeve 77 mounted in a block 78 fixed to the slide bar 72. The shaft 76 carries a projecting arm 79 which is formed with a transverse recess 80 in its outer end. A plunger 81, see Fig. 27, is mounted to reciprocate in a supporting sleeve 82. Said plunger has an enlarged head 83 fitting the inner wall of the sleeve 82. Said enlarged head is provided with a blade 84, which is adapted to engage the recess 80 in the arm 79 of the shaft 76. The other end of the plunger 81 extends into a recess in an adjustable bolt 85. This adjustable bolt is threaded into the support 86 which carries the sleeve 82. A spring 87 bears at one end against the enlarged head 83 of the plunger 81 and at its other end against this bolt 85. By adjusting the bolt the pressure of the spring may be varied. The supporting head 86 for the sleeve 82 has a laterally supporting stud 88, which is journaled in the block 78. The pivotal axis of the shaft 76 is so located relative to the pivotal axis of the supporting stud 88 for the sleeve 82 that the gripping finger may be moved to the position shown in Fig. 24 in full lines, or to the position shown in dotted lines in said figure, and said spring, through the action of the plunger will hold the gripping finger in both of these positions. On the extreme outer end of the shaft 76 is a lug 89. Mounted on the bed of the press are two spaced lugs 90 and 91. An adjustable stop screw 92 is mounted in the lug 90 and an adjustable stop screw 93 is mounted on the lug 91. These stop screws project in opposite directions and may be held in adjusted positions by lock nuts 94. These stop screws are in the path of travel of the lug 89 on the shaft 76. When the slide moves upwardly, as viewed in Fig. 20, the lug 89 will strike the stop screw 92 which will move the gripping finger to the full line position, as shown in Fig. 24. When the slide 72 moves in the opposite direction this lug 89 will strike the stop screw 93 and the gripping finger will be moved to the dotted line position. The only difference between the gripping fingers on the two sides of the machine is that one is mounted to operate a little higher than the other. The purpose of this off-setting of the gripping fingers is to position said griping fingers, so that the sheet will be gripped on the left of the machine, as viewed in Fig. 20 where there is the greatest amount of waste material.

Coöperating with this gripping finger 75 is a raised gripping plate 95. This plate is raised so that the upper face is substantially level with the faces of the dies 6—6. Said gripping plate is chamfered at its edges as at 96 to permit the sheet to pass freely over the same. Said plate is also formed with a shoulder 97 which is located so that the gripping finger when engaging the sheet will make a slight bend or indent in the sheet so as to prevent the sheet slipping relative to the gripping finger.

When the slides are arranged in their extreme upper position the gripping fingers will be tripped so as to engage the sheet. A downward movement of the slides conveys the sheet to the next cutting position. When the fingers have carried the sheet to a proper position for cutting the stop screws 93 will trip the gripping finger in the opposite direction so as to cause it to disengage the sheet. It will, therefore, be obvious that the length of the feed stroke depends upon the time when the gripping finger engages the sheet for the beginning of the feeding operation and when the gripping finger disengages the sheet at the end of the feeding operation. This timing of the gripping finger is entirely controlled by the fixed stop screws 92 and 93 and has no relation whatever to the throw of the reciprocating bars 72. It will, therefore, be apparent that variation in the thickness of the material will not in any way vary the length of the resulting feed stroke as the movement of the gripping finger in contact with the sheets is not a part of the feed stroke. The stop screws, above referred to, do not cause the gripping fingers to engage the sheets, but merely trip the same so that the springs 87 will operate to cause the gripping action. By adjusting these stop screws the length of the feed may be varied and this may be accomplished as is obvious without varying the length of the stroke of the reciprocating bars 72. The spring pressed plunger 81, together with its arm 79, forms a self locking toggle tripping mechanism, which, as noted, holds the gripping fingers in either position. The on and off friction of the presser arms 55 is, of course, timed so as to grip the sheet during the idle movement of the gripping finger 75—that is to say, when these gripping fingers are on their upward stroke, the presser arms 55 will grip and hold the sheet. As soon as the fingers engage the sheet, then the presser arms will release the sheet and permit the feed to take place. It will be understood, of course, that the feed of the sheet occurs when the dies 5 are out of contact with the sheet and at the outer end of their stroke.

*Justifying means for initially positioning the sheet.*

As above noted, the sheet is presented for the first operation to the upper three only of the gang of dies. It is essential that this gang of dies shall operate upon the sheet as close to the edge as may be practical and at the same time the edge of the material should be clear of the other row of dies, which is idle at this time. The cutting of the idle dies into the edge of the sheet not only injures the waste material of the sheet, but also is liable to injure or clog the dies. If the sheets which are fed to the die press are trimmed accurately the oscillating arms $F^2$ will present the sheet to the upper row of dies in proper position for the cutting of the first can ends. This position may be readily varied by adjusting the link 39 which varies the oscillating position of the arm $F^2$. It often occurs, however, that there is a slight variation in the length of the sheet, particularly is this true when the sheet is not prepared by a previous trimming operation. In order to properly present sheets which may vary slightly in length for the first or initial operation, I have provided justifying fingers which engage the lower edge of the sheet and raise the same if necessary in order that the idle dies may clear the lower edge.

These justifying fingers are clearly shown in Figs. 4, 12, 13, 14 and 32. The supporting bed for the dies is provided with two recesses 97. Located within each recess is a supporting member 98, which has a slot 99. Located in said slot is the justifying finger 100. Said finger is pivoted at 101 and normally rests on a pin 102. This finger has its upper face substantially straight and terminates in a projection 103. The extreme end of this projection 103 is normally within the face of the supporting bed or within the plane of the outer face of the dies, so that a sheet passing over the dies will pass over the projection 103. The reciprocating head of the die press carries a rod 104, for each finger which projects from the head and has a tapered face 105. This tapered face 105 of the rod is adapted to enter the slot 99 underneath the rounded lower face of the justifying finger 100 and will raise the same to the dotted line position as shown in Fig. 12.

When the sheet O is fed to the die press, the lower edge of the sheet is adapted to be engaged by these justifying fingers which are raised by the rods 104 and the said rods will engage the justifying fingers and raise the same just prior to the dies making contact with the sheet for cutting and shaping the can ends. The upper position of the justifying fingers, therefore, determines the position of the lower edge of the sheet.

Let us assume that the sheet O, as viewed in Fig. 32, is extra long and when the arm F² is in the position shown therein, said sheet would be carried to a point where the lower or idle dies would strike the sheet. These justifying fingers being raised by the rods 104, will engage the lower edge of the sheet and raise the sheet slightly, so that the idle dies will clear the same. Said justifying fingers, therefore, initially position the sheet for the first cutting operation. It is to be understood that this movement of the sheet is very slight, although very important and that the sheet can move sufficiently to permit the initial positioning of the same notwithstanding the fact that the upper edge of the sheet is engaged by the oscillating arm F².

The timing of the justifying fingers is such that the sheet is justified just before the presser arms 55 engage and clamp the same. As above noted, these justifying fingers may be omitted from the die press if the sheets are trimmed accurately and if the sheets are approximately accurate these justifying fingers are not necessary. In other words, the stroke of the arm F² may be so nicely adjusted through the mechanism above described that the sheets of extreme lengths will be positioned so that the idle dies will just pass by the same and the variation in the length of the sheets from this extreme sheet to shorter lengths will be immaterial.

*Justifying means for positioning the sheets for the final cutting operations.*

The means for intermittently feeding the sheets to the gang of dies may be adjusted with great nicety and will feed the sheets with great accuracy—nevertheless, there is often a variation in the sheet or a variation in the feed sufficient to cause the sheets to overlap the idle dies on the last cutting operation. In order to insure that the sheet shall be positioned properly, for the final cutting operation, I have provided a justifying mechanism for bringing about this position of the sheet. This justifying mechanism is shown in Figs. 4 and 15 to 18, inclusive. The upper portion of the bed is formed with two recesses 106. A reciprocating slide 107 is mounted in each recess. A cover plate 109 covers the recess and is slotted, as at 110. Said slide 107 is provided with a pivoted and justifying finger 111. Said finger is normally pressed outwardly by a spring 112 which bears against a plunger 113. A stop 114 limits the outward movement of the finger. Said finger depends below its pivotal point 115, so that a sheet in passing down over the finger will freely pass over the same. The lower face of the finger, however, when protected will engage the upper edge of the sheet. The slide 107 is pivoted at its upper end to a lever 116. This lever is fulcrumed at 117. A spring 118 carried by the supporting bed of the press normally raises the outer end of the lever and depresses the slide. A stop screw 119 limits the downward movement of the slide. The extreme outer ends of the levers are in the path of an adjustable screw 120 carried by a projecting lug 121 fixed to the upper end of the reciprocating slides 72. These stop screws are adapted to engage the outer ends of the levers and raise the slides while the springs move the slides in the opposite direction until the stops 119 limit their movement.

When the sheet is positioned for the last operation of all the dies on the sheet, the upward edge of the sheet is just above the upper edge of the upper row of dies. At this time the upward movement of the slides 107 will carry the justifying fingers above the upper edge of the sheet and when these slides are released through the upward movement of the reciprocating bar 72, the springs 118 will force the slides outward and the fingers now engaging the upper edges of the sheet will force the sheets downward, so as to position the same for this cutting operation. If the sheet is extra long the fingers will force the same downward, so that the upper edge of the sheet will be just above the openings cut by the upper row of dies. On the next feeding movement of the sheet the upper edge will be carried to a point where it will be cleared by the idle row of dies. The throw of the justifying fingers may be readily varied by adjusting the stop screws 119. The movement of the justifying fingers to position the sheet occurs just as the reciprocating bars 72 are beginning their upward stroke for the idle movement of the gripping fingers of the feed and just about as the presser bars are engaging the sheet, and even though the presser arms be in engagement with the sheet, these justifying fingers may shift the sheet sufficiently to accomplish this result.

*Modified form of feeding mechanism.*

While I have described my gang press as adapted to be used in conjunction with a mechanism for preparing the sheets, wherein the waste material is cut and the sheet trimmed, if desired, it will also be obvious that my improved feeding mechanism for the die press may be used without this preparing mechanism. It will be understood, therefore, that the sheets may be fed by hand to a conveyer which directs the same to the oscillating arms $F^2$ which in turn presents the sheet to the feeding mechanism for the gang die press.

In Figs. 35 to 40, inclusive, I have shown a different form of feeding mechanism which is especially adapted for feeding the sheets directly to the gang die press. In this form of the invention, the main frame 1 is provided with a projecting table 122, on which the sheets are laid one at a time, which are to be conveyed to the feeding-in mechanism for the die press. In this form of the invention the die press P and the feeding-in guides 31 are of the same construction as above described. An oscillating arm $F^2$ also operates to convey the sheets to the die press. The sheets are conveyed along the table 122 by endless chains 123. These chains run from suitable sprocket wheels 124 and 125. The shaft carrying the sprocket wheels 125 is connected by a sprocket chain 126 with a short shaft 127. This short shaft carries a gear 128, which meshes with a gear 129 carried by another short shaft, which in turn carries a sprocket wheel 130. A sprocket chain 131 connects the sprocket 130 with a sprocket wheel on the main shaft 3 which is driven by the belt wheel 4. As the main shaft rotates these conveyer chains 123 will be rotated. The conveyer chains carry projecting lugs 131'. These chains run in suitable channels 132 in the table 122. The sheets are placed on the table and the lugs will engage the sheets and carry them forward. These lugs are so spaced and the conveyer so timed as to feed the sheets in proper timing to the oscillating arms $F^2$, which operate as above described to convey the sheets through the curved guiding channels to the gang die press.

*Receiving chute.*

After the ends have been cut from the sheet they drop by gravity into a chute 134 which is located beneath the press and connected to the main frame by a bracket 135. The scrap metal also drops by gravity from the press on to a rack 136. This rack is made of spaced bars which prevents the ends from dropping through on to the bottom plate 137 of said chute. Said chute is also provided with side plates 138. The bars forming the rack 136 are connected to a cross bar 139. This rack separates the scrap metal from the formed ends which may be readily carried from the chute on to a conveyer or otherwise disposed of.

*Operation of the machine.*

The operation of the machine will be obvious from the above description. The sheets are taken from the stack by the pneumatic feeding mechanism one by one and are conveyed by the reciprocating feed bars first to the preparing mechanism and then to the feeding-in mechanism which presents the sheets to the gang die press. The sheets pass in a horizontal direction through the preparing machine or over the receiving table, if a preparing machine is not used and are thus directed through the guiding channel to a vertical position where they are fed to the gang die press. Inasmuch as the gang dies reciprocate back and forth in a horizontal direction, the vibration due to the cutting of the metal is reduced to a minimum. The bending of the sheet as it passes from a horizontal to a vertical direction takes all the buckles or bends out of the sheet and also stiffens the same so that it may be more readily directed by pushing fingers which engage the rear end of the sheet only. The gripping fingers formed from the walls of the guiding plates operate to continuously grip the sheet as it passes through said guiding channel and prevents the sheet from falling from the machine until engaged by the controlling feed for the gang die press. The initial positioning of the sheet may be accomplished from one aspect of the invention solely through the operation of the oscillating arms $F^2$, in which the stroke of the arms is adjusted so that for extreme lengths of sheets the lower edge of the sheet will clear the idle dies in the first cutting and forming operation. In another aspect of the invention this lower edge of the sheet is engaged by the justifying fingers above described, which serve to raise the sheet, if the lower edge thereof is below the proper line for cutting and position the same so that the idle dies will clear the edge.

After the first operation, the intermittent feeding fingers will grip the sheet and feed it step by step for the various cutting operations. These gripping fingers are controlled entirely by fixed tripping screws and do not depend upon the stroke of the feed slides, so that the feed strokes may be accurately adjusted and will not vary if the thickness of the material should vary or any other unevenness in the surface of the metal should slightly vary the position of the gripping fingers when in engagement with the sheet. The final position of the sheet is justified by reciprocating fingers which engage the upper edge of the sheet at the last cutting operation where all the dies operate upon the sheet. These justifying fingers are controlled by stop screws and the stroke of the same may be quickly adjusted. The movement of the fingers for positioning the sheet is brought about by springs, as described above. It is obvious, however, that these fingers may be positively moved for accomplishing the same result.

The feeding of the sheet in a vertical direction while the ends are being cut and formed greatly facilitates the handling of the scrap metal left, which is often tied together merely by threads of metal. By this vertical movement of the scrap metal gravity assists greatly in handling the sheet. Furthermore, as soon as the ends are cut and shaped and stripped from the dies, they will at once drop by gravity from the machine and will not be caught by the dies in the subsequent cutting operation. The cut and formed ends are readily separated from the scrap metal and may be conveyed away from the machine by an endless conveyer or the like.

While I have described my invention in detail as applied to a gang die press for cutting and shaping can ends, it will be understood that the feeding mechanism for feeding the gang die press and the justifying means may be used in other types of machines for cutting and shaping metal articles.

It will also be obvious, as has been noted above, that, instead of using means for cutting nail caps and trimming the sheet or a preparing mechanism for the sheet before it is fed to the gang die press, I may use my improved feeding and justifying means with the gang die press without these preparing devices.

It is also obvious that minor changes in the detail of construction and arrangement of parts may be made without departing from the spirit of the invention as set forth in the appended claims.

Having thus described my invention, what I claim as new and desire to secure by Letters Patent, is:

1. The combination of a die press having dies reciprocating in a horizontal direction, mechanism for punching caps from the waste material of the sheet, said mechanism including dies operating in a vertical direction, automatic feeding mechanism for presenting the sheet to the cap cutting mechanism and then to the die press, and curved guides between the cap cutting mechanism and the die press for changing the direction of feed of the sheet, said sheet being curved by said guides.

2. The combination of a die press including a reciprocating head moving in a horizontal direction, a horizontal table along which the sheets are fed, means for directing the sheets from the horizontal table to a vertical position for passing the same through the die press, means operating on the sheet while on said horizontal table for preparing the same for the die press, automatic means for taking the sheets one at a time from a stack and delivering the same to the table, and means for feeding the sheets along said table.

3. The combination of a gang die press for cutting sheet metal, of mechanism for feeding the sheets to said die press including devices for feeding the sheet step by step through the die press, means for presenting the sheet to said feeding means and for initially positioning the sheet for the first cutting operation, and means for engaging the sheet and positioning the same for the final cutting action of the dies on said sheet.

4. The combination of a gang die press having two rows of staggered dies, and mechanism for preventing sheets of metal to said die press including devices for feeding said sheets step by step through the die press, oscillating arms for engaging the sheet and presenting the same to the feeding means and for initially positioning the sheet for the first cutting operation.

5. The combination of a gang die press having two rows of staggered dies, and mechanism for feeding sheets of metal to said dies including devices for feeding the sheets step by step through the die press, means for presenting the sheet to the die press and initially positioning the same so that the first row of dies only is effective to cut the sheet.

6. The combination of a gang die press having two rows of staggered dies, and mechanism for feeding sheets of metal to said dies including devices for feeding the sheets step by step through the die press, means for presenting the sheet to the die press and initially positioning the same so that the first row of dies only is effective to cut the sheet, and means for engaging the sheet and positioning the same for the final action of all the dies on the sheet, whereby in the cutting action of the last row of dies the idle dies will clear the sheet.

7. The combination of a gang die press having two rows of staggered dies, and mechanism for feeding the sheets of metal to said dies including devices for feeding the sheet step by step through the die press, means for presenting the sheet to said feeding devices, means for justifying the sheet on the initial positioning of the same, and means for justifying the sheet for the final action of the dies thereon.

8. The combination of a gang die press having two rows of staggered dies operating in substantially horizontal lines, and automatic means for feeding sheets of metal vertically between the dies including intermittently operated devices for engaging and supporting the sheet, and devices for feeding the sheet step by step through the dies when released by said supporting devices.

9. The combination of a gang die press having two rows of staggered dies operating in substantially horizontal lines, and automatic means for feeding sheets of metal vertically between the dies including intermittently operated devices for engaging and supporting the sheet, devices for feeding the sheet step by step through the dies when released by said supporting devices, and means for presenting the sheet to the feeding devices.

10. The combination of a gang die press having two rows of staggered dies operating in substantially horizontal lines, and automatic means for feeding sheets of metal vertically between the dies including intermittently operated devices for engaging and supporting the sheet, devices for feeding the sheet step by step through the dies when released by said supporting devices, and oscillating arms for engaging and presenting the sheet to the feeding devices, the said arms operating to initially position the sheet for the first cutting operation.

11. The combination of a gang die press having dies movable in horizontal lines and mechanism for feeding the sheets of metal vertically between the said dies including intermittently operated clamping arms for engaging and holding the sheet, and intermittently operated feeding devices for feeding the sheets when released by said holding arms, a horizontal table on which the sheets are initially placed, curved guides for directing the sheet from the horizontal table between the dies, and means for feeding the sheets through said curved guides to the feeding devices.

12. The combination of a gang die press having dies movable in horizontal lines and mechanism for feeding the sheets of metal vertically between the said dies including intermittently operated clamping arms for engaging and holding the sheet, and intermittently operated feeding devices for feeding the sheets when released by said holding arms, a horizontal table on which the sheets are initially placed, curved guides for directing the sheet from the horizontal table between the dies, and means for feeding the sheets through said curved guides to the feeding devices, said curved guides carrying friction devices for frictionally engaging the sheet.

13. The combination of a gang die press having dies movable in horizontal lines and mechanism for feeding the sheets of metal vertically between the said dies including intermittently operated clamping arms for engaging and holding the sheet, and intermittently operated feeding devices for feeding the sheets when released by said holding arms, a horizontal table on which the sheets are initially placed, curved guides for directing the sheet from the horizontal table between the dies, means for feeding the sheets through said curved guides to the feeding devices, said curved guides carrying friction devices for frictionally engaging the sheet, and justifying devices for engaging the upper edge of the sheet for positioning the sheet for the final cutting action of the dies on the sheet.

14. The combination of a gang die press having two rows of staggered dies movable in substantially horizontal lines, and means for feeding sheet metal between the dies in a substantially vertical direction, including a horizontal supporting table for the sheets, curved guiding plates for directing the sheets from the horizontal table between the dies, means for engaging the sheets and feeding them to said guiding plates, friction means at the lower ends of the guiding plates for engaging the sheets, devices for feeding the sheets step by step to the dies, and clamping arms for engaging and holding the sheets during the idle movements of said feeding devices.

15. The combination of a gang die press having two rows of staggered dies movable in substantially horizontal lines, and means for feeding sheet metal between the dies in a substantially vertical direction, including a horizontal supporting table for the sheets, curved guiding plates for directing the sheets from the horizontal table between the dies, means for engaging the sheets and feeding them to said guiding plates, friction means at the lower ends of the guiding plates for engaging the sheets, devices for feeding the sheets step by step to the dies, clamping arms for engaging and holding the sheets during the idle movements of said feeding devices, and justifying means for engaging the upper edge of the sheet for positioning the same for the final action of the dies on the sheet, whereby the idle dies will clear the upper edge of the sheet.

16. The combination of a gang die press and mechanism for feeding sheet metal between the dies of the press, including intermittently operated clamping devices for the sheet, devices for feeding the sheet step by step when released by said clamping devices, and means for presenting the sheet to said feeding devices and initially positioning the sheet for the first cutting operation.

17. The combination of a gang die press and mechanism for feeding sheet metal between the dies of the press, including intermittently operated clamping devices for the sheet, devices for feeding the sheet step by step when released by said clamping devices, means for presenting the sheet to said feeding devices and initially positioning the sheet for the first cutting operation, and justifying devices for positioning the sheet for the final action of the dies thereon.

18. The combination of a gang die press having a gang of dies and mechanism for feeding sheets of metal between the dies including gripping fingers for gripping and feeding the sheet, reciprocating slides carrying the said fingers, and means independent of said reciprocating means for holding the gripping fingers in contact with the sheet or out of engagement therewith.

19. The combination of a gang die press having a gang of dies and mechanism for feeding sheets of metal between the dies of said press including gripping fingers for engaging and feeding the sheet, reciprocating slides carrying said fingers, yielding means for causing said gripping fingers to engage or disengage the sheet, and stationary means for tripping into action said yielding means for said fingers.

20. The combination of a gang die press and mechanism for feeding sheets of metal between the dies including gripping fingers, reciprocating slides for said fingers, yielding toggle mechanism for holding the fingers in engagement with the sheet or out of engagement therewith, and adjustable stops for tripping said toggle mechanism for causing the fingers to engage the sheet at one end of the stroke of the reciprocating slides and to disengage the sheet at the other end of the stroke thereof.

21. The combination of a gang die press having a gang of dies and mechanism for feeding sheets between the dies including reciprocating gripping fingers, and adjustable stationary devices coöperating with said fingers for determining the feed stroke of said fingers.

22. The combination of a gang die press having a reciprocating head carrying dies movable in a horizontal direction and mechanism for feeding a sheet of metal between the dies including intermittently operated gripping fingers, presser arms for engaging the sheet and holding the same when released by said gripping fingers, and means operated by the reciprocating head for actuating said presser arms.

23. The combination of a gang die press having a reciprocating head carrying dies and mechanism for feeding a sheet of metal between the dies including intermittently operated gripping fingers, presser arms for engaging the sheet and holding the same when released by said gripping fingers, springs for yieldingly holding said presser arms in contact with the sheet, and means carried by said reciprocating head for moving the arms out of engagement with the sheet during the feed stroke of said gripping fingers.

24. The combination of a die press including a reciprocating head carrying two rows of staggered dies and mechanism for feeding sheets between the dies including reciprocating slides located at each side of said reciprocating head, gripping fingers mounted on said slides, said gripping fingers being located at the ends of the rows of dies, yielding toggle mechanism for moving and holding the fingers in engagement with the sheet and for moving and holding the fingers out of engagement with the sheet, each finger having a projecting lug, adjustable screws adjacent the end of the stroke of the feed fingers for engaging the lugs for tripping the toggle mechanisms, the screws at one end of the stroke operating to cause the fingers to engage the sheet and the screws at the other end of the stroke operating to cause the fingers to disengage the sheet, whereby said feed stroke is regulated by said adjustable screws and is independent of the reciprocating stroke of said fingers.

25. The combination of a die press having a reciprocating head, a gang of dies and mechanism for feeding sheets of metal between said dies including devices for presenting the sheet to the dies, justifying fingers for engaging the front end of the sheet for initially positioning the same for the dies, and means carried by said reciprocating head for actuating said justifying fingers.

26. The combination of a die press having a reciprocating head carrying a gang of dies, mechanism for feeding sheets of metal between the dies including devices for presenting the sheet to the dies, oscillating justifying fingers for engaging the front edge of the sheet, rods carried by the reciprocating head and having cam faces for engaging the said justifying fingers for actuating the same to initially position the sheet for the first cutting operation of the dies.

27. The combination of a die press having a gang of dies, mechanism for feeding sheets of metal between the dies including reciprocating feeding devices, justifying fingers independent of the sheet feeding mechanism for engaging the rear edge of the sheet, and means for moving said justifying fingers for positioning the sheet for the final action of the dies on the sheet.

28. The combination of a die press having a gang of dies, mechanism for feeding sheets of metal between the dies including reciprocating feeding devices, justifying fingers for engaging the rear edge of the sheet, reciprocating slides carrying said justifying fingers, levers supporting the slides, yielding means for moving the levers for actuating the fingers to position the sheet, and means for engaging the levers for raising said fingers.

29. A die press having a gang of dies, mechanism for feeding the sheets of metal between said dies including a horizontal supporting table, conveyers for moving the sheets along said table, guides for directing the sheets from the table to the die press, oscillating arms for engaging the sheets carried by said conveyers and moving the same along said guides to said die press.

30. A die press having a gang of dies, mechanism for feeding sheets of metal between said dies including a horizontal supporting table, conveyers for moving the sheets along said table, guides for directing the sheets from the table to the die press, oscillating arms for engaging the sheets carried by said conveyers and moving the same along said guides to said die press, and means whereby the oscillating position of said arms may be varied for varying the initial position of the sheet for the first cutting operation.

31. The combination of a die press having a reciprocating head carrying a gang of dies movable in horizontal lines, mechanism for feeding sheets of metal between said dies including a horizontal table, conveyers for moving the sheets along the table, curved spaced guiding plates for guiding the sheets from the horizontal table and passing the same vertically between the dies, and oscillating arms for engaging the sheets and moving the same through said curved guides.

32. The combination of a die press having a reciprocating head carrying a gang of dies movable in horizontal lines, mechanism for feeding sheets of metal between said dies, including a horizontal table, conveyers for moving the sheets along the table, curved spaced guiding plates for guiding the sheets from the horizontal table and passing the same vertically between the dies, oscillating arms for engaging the sheets and moving the same through said curved guides, and friction devices at the lower end of said guide plates for engaging and guiding the side edges of the sheet.

In testimony whereof, I affix my signature in the presence of two witnesses.

HARRY C. H. WALSH.

Witnesses:
GRAHAM D. REEDY,
E. H. HALL.